United States Patent [19]
Cole et al.

[11] Patent Number: 5,012,088
[45] Date of Patent: Apr. 30, 1991

[54] HIGH PERFORMANCE FIBER OPTIC SENSOR

[76] Inventors: James H. Cole, 9404 Fairpine La., Great Falls, Va. 22066; Ira J. Bush, 1063 Point View St., Los Angeles, Calif. 90035

[21] Appl. No.: 330,914

[22] Filed: Mar. 31, 1989

[51] Int. Cl.$^5$ .............................................. H01J 5/16
[52] U.S. Cl. ................................. 250/227.19; 356/345
[58] Field of Search ...................... 250/227.19, 227.27, 250/231.1, 227.14, 227.17; 356/345

[56] References Cited

U.S. PATENT DOCUMENTS

| | | | |
|---|---|---|---|
| 4,375,680 | 3/1983 | Cahill et al. | 356/345 |
| 4,495,411 | 1/1985 | Rashleigh | 250/227.19 |
| 4,848,910 | 7/1989 | Dupraz | 356/345 |
| 4,853,534 | 8/1989 | Dakin | 250/227.19 |

*Primary Examiner*—David C. Nelms
*Attorney, Agent, or Firm*—Reed Smith Shaw & McClay

[57] ABSTRACT

An optical sensor and method for measuring naturally occurring phenomena such as vibrations is disclosed. An optic fiber is wound as a coil and placed such that strain is introduced in it by the phenomena. Low coherence light is launched through a coupler and split to produce counter rotating beams in the coil. The counter rotating beams are phase modulated by an optical modulator driven by an oscillator and by naturally occurring phenomena. The sensitivity and response of the sensor increases dependent on the length of fiber in the coil and improves linearly as the frequency of source signal increases. The modulated counter rotating beams are recombined in the coupler to produce an intensity modulated optical signal on a photodetector. The output of the detector is an electrical signal containing the signal of interest as modulation which is recovered througth demodulating circuits mixing the fundamental and second harmonic frequencies.

14 Claims, 2 Drawing Sheets

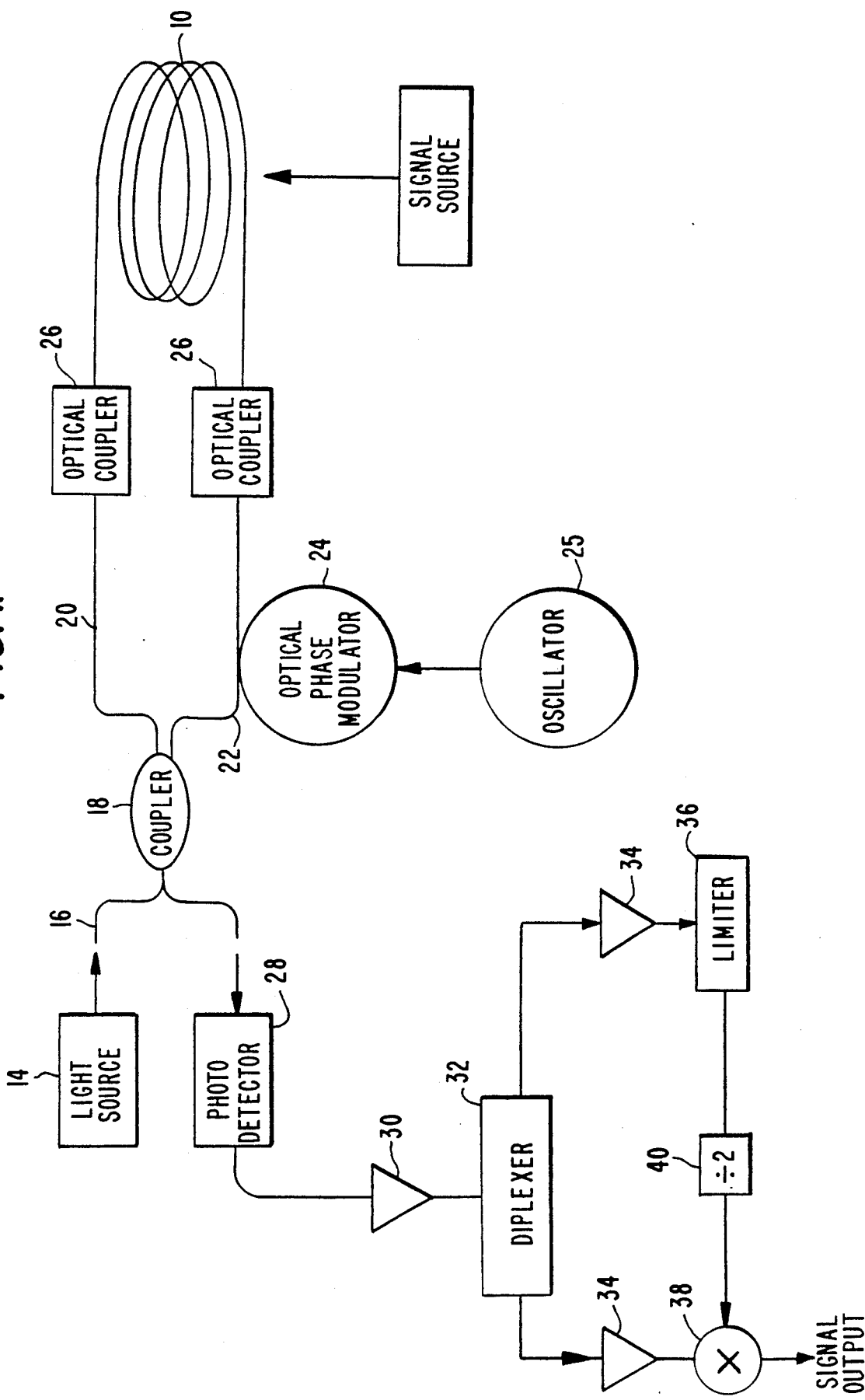

HIGH PERFORMANCE FIBER OPTIC SENSOR

BACKGROUND OF THE INVENTION

This invention concerns a method and means for measuring high frequency analog signals, such as vibrations from a building, bridges, a car or other body to which a sensor may be attached using a fiber optic sensing device. The applications for such sensors are many, for example, vibration sensors mounted on automobiles could be used to provide a signal to a servo control which could adjust air shock absorbers to provide an extremely smooth ride. Vibration sensors could be mounted on buildings which are under construction in order to detect large motions and provide alarms which would warn construction workers of approaching collapse preventing tragedies prevalent at such sites. Monitoring bridges such as the one which collapsed in Connecticut a few years ago could also present tragedies.

Another application for vibration sensors is intrusion detection for security systems. Conventional devices often fail due to false alarms caused by detection of low frequency signals such as vibrations of a truck on a nearby street. The optical configuration described here would be configured to discriminate against such low frequency signals. Sensing other phenomena such as thermal and ultrasonic variations when measured using this sensing technique also have applications for security systems as well as other systems.

Conventional sensors for measuring vibratory motion, dynamic thermal fluctuations or other physical phenomena of interest are typically designed to sense low frequency variations which are characterized by signals of relatively large amplitude. As the frequency associated with the phenomena to be measured, e.g., vibrations, increases, the signal amplitude decreases except in the region of resonances.

Sensors currently available in the market have flat frequency responses such that their ability to detect signals at higher frequencies decreases. That is, the dynamic range of sensors with flat frequency responses is limited by the large amplitudes generated by virtually every natural phenomena at low frequencies. Using vibrations as an example, a typical sensor which exhibits a flat response with respect to frequency and which has limited sensitivity for detecting high frequency vibrations is the PCB Model 303A02 accelerometer. When used with the amplifier designed for this accelerometer, it is limited to $1 \times 10^{-5}$ gs at 8 kHz.

The response curves for currently available accelerometers may be plotted. Assuming, for example, that the amplitude of the signal to be measured, e.g., vibrations, decreases linearly with an increase in frequency, the transfer function of sensors currently available to measure such signals are flat with respect to frequency such that the relative output of sensors decreases linearly as frequency increases. For example, assume that the minimum detectable signal of a typical sensor is 1 at 1 Hertz with a relative output signal of 1000 at that frequency. The transfer function for that sensor dictates a signal to noise ratio of only 5 at a frequency of 1 kHz.

The sensor of the present invention overcomes these difficulties of the prior art sensors. It employs an optical configuration which provides a transfer function which increases linearly with frequency, thus providing greater sensitivity at higher frequencies. As used herein, the term high frequency is a relative term. It can in an extreme example be only a few Hertz. Typically, the current frequency ranges within the meaning of this term are 100 Hz to 100 kHz.

The configuration of the invention described herein provides optimum response maximizing both high frequency sensitivity and dynamic range of the sensor. The transfer function for the device of the invention increases linearly with frequency. Thus, in the example given above on the assumption of boundaries of 1 Hertz and 1 kHz, the signal to noise ratio of the sensor of the current invention is 1000 at both boundaries.

This optical sensor configuration is ideal for measuring high frequency signals and can be utilized for sensing virtually any parameter which can be measured with an optical fiber interferometer, e.g., acoustic, magnetic, electrical fields, thermal fluctuations, vibrations, strains and so forth. Fiber optic accelerometers are known but they too have flat frequency responses and, consequently, poor minimum detection thresholds at high frequencies. They are also sensitive to interference from low frequency environmental factors such as temperature variations.

SUMMARY OF THE INVENTION

It therefore is a principal object of this invention to provide a new and improved sensing device to detect high frequency signals such as vibration with improved frequency response, sensitivity, dynamic range and stability.

It is another object of the invention to provide a new energy sensing device which employs fiber optics to sense signals and utilizes stabilizing signals to improve sensitivity for the full dynamic range anticipated from the phenomena to be sensed, for example, a vibrating body.

It is another object of the invention to provide a new method for detecting high frequency vibrations or other phenomena without loss of high sensitivity of the detectors by utilizing a fiber interferometric configuration which rejects low frequency vibration information via optical means, then converts the information to an electrical analog signal.

The objects of this invention are realized by a method and devices in which the source of vibrating energy, as an example, is used to effect modulation of a light beam which in turn is converted into an electrical signal containing the information of interest and is demodulated to recover that information as an electrical signal.

More specifically, the objects of the invention are realized by applying the vibrating signal to change the length of an optical fiber, measuring the changes using an optical interferometer to produce a light signal that is intensity modulated with the information of interest, detecting the intensity modulated signal with a photodetector, and demodulating the resulting output to recover the information as an electrical signal.

BRIEF DESCRIPTION OF THE DRAWINGS

FIG. 1 is a block diagram of a vibration sensing device and the optical and electrical circuits used to detect high frequency vibrating signals according to the invention.

DETAILED DESCRIPTION OF THE INVENTION

Figure 2A:
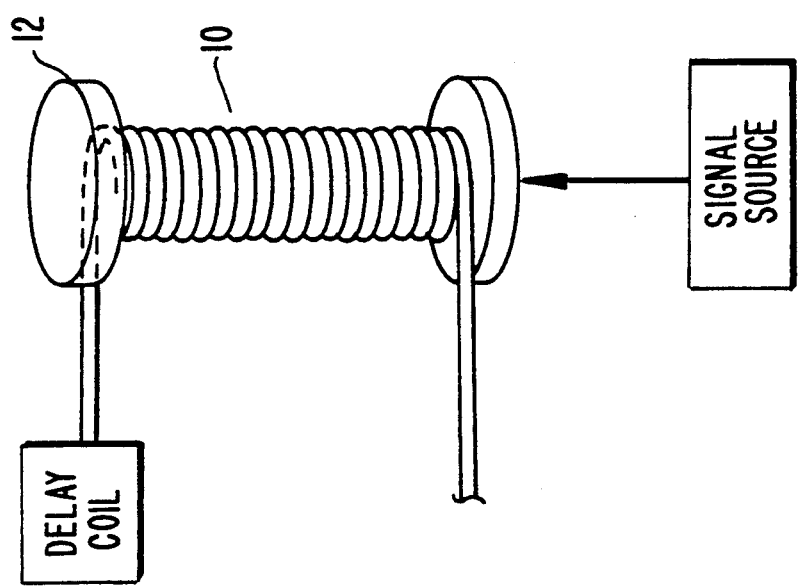
FIG. 2a shows a sensing device using fiber optics that may be used in the circuits of FIG. 1.

Referring to FIG. 1 of the drawings a transducer 10 consisting of a fiber optic wound in a coil may be attached to a source of vibrating energy, e.g., a building or a car. An appropriate configuration of the transducer 10 is shown in FIG. 2a of the drawings. Thus, a single mode optical fiber may be wound under tension onto an appropriate spool 12 made or molded out of elastic material. The spool may be attached to the source of vibrations such that motion from the source is transmitted along the axis of the spool and through the Poisson effect produces radial strains in the optical fiber. These strains alter the optical path in the fiber, and that will affect the phase of a light beam in the fiber.

Referring again to FIG. 1, the optical circuit includes a source 14 of low coherence light launched into an optical fiber 16. Low coherence light is preferred for the reason a source of this kind exhibits better noise performance than high coherence sources. A source 14 which may be used in the preferred embodiment is made by and marketed as a SuperLuminescent diode (SLD). The fiber 16 should preserve polarization of light from the source and be of such length to operate as a decorrelator of the two polarization states.

The fiber 16 is fused as an input to a single mode coupler 18 which equally splits the light into two beams applied at the other side of the coupler to optical fibers 20 and 22. In the preferred embodiment, the fiber 20 consists of two polarization preserving fibers which are fused together with a 45 degree angle between the principal axes of the two fibers such that they operate as a depolarizer. The lengths of the fibers should be such as to ensure uniform distribution of the polarization states in the sensor 10 so that interferometric visibility is maintained at ½.

The other fiber 22 is connected to a phase modulator 24 comprising a single mode fiber wrapped around a piezoelectric element. The modulator should be positioned in relatively close proximity to the coupler. The other end of the modulator may be fused directly to one end of the sensor coil 10 with the other end of the coil fused to the fiber 20. Alternatively, the fiber 20 and the sensor side of the modulator 24 may be connected through optical connectors 26 to the opposite ends of the sensor coil.

In the optical circuit shown, counter rotating beams of light are interjected into the opposite ends of the sensor 10 such that they combine or merge into one beam. If the modulator 24 is controlled to operate at a carrier frequency supplied by an oscillator 25, the vibrating signal applied to the sensor 10 can be used to phase modulate the counter propagating optical signals. The modulation frequency of the oscillator can be in the range of 3 to 10 times the maximum frequency of the signal, e.g., vibrational signals, that are to be sensed or measured. The counter rotating optical signals are coherently combined by the coupler 18 to produce an amplitude modulated intensity signal. That signal may be detected by photodetector 28, which in turn is connected through a conventional amplifier 30 to a demodulator circuit used to recover the signal obtained from the vibration sensor 10.

The amplifier 30 is coupled to a diplexer 32 which separates and filters the carrier and the second harmonic, and these signals are applied through amplifiers 34 to a limiter 36 and a mixer 38. The limiter is applied to the mixer through a divide by two divider 40 to provide a phase reference at the fundamental frequency. The mixer 38 performs AM detection at the carrier frequency to recover the electrical analog of the vibrational signal detected by the sensor.

The operation of the sensor, optical interferometer and demodulator circuitry may be understood from the expressions which follow. The field amplitudes of the counter propagating beams in the sensor 10 can be written as:

$$E_1 = A e^{j(\omega_o t + C \sin \omega_m t + D \sin \omega_a t)} \quad (1)$$

$$E_2 = B e^{j(\omega_o t + C \sin \omega_m (t-d) + D \sin \omega_a (t-d))} \quad (2)$$

where $\omega_o$ is the optical frequency of the source 14, $\omega_m$ is the frequency of the oscillator 25 driving the piezoelectric fiber stretching phase modulator 24, d is the delay time associated with the sensor 10 between the two counter propagating optical beams introduced at each end thereof, $\omega_a$ is frequency of the vibrating signal of interest applied to the sensor 10, A, B are field amplitudes, and C, D are peak phase amplitudes.

The optical intensity at the coupler 18 after coherent combination of the carrier signal at modulator and the phase displacement at the sensor is given by the following:

$$I(t) = A^2 + B^2 + 2AB \cos \{ C \sin \omega_m t - C \sin \omega_m (t-d) + D \sin \omega_a t - D \sin \omega_a (t-d) \} \quad (3)$$

where the terms at the optical frequencies are ignored, and the $A^2$, $B^2$ terms are at DC. The remaining terms contained in the brackets of (3) are the terms of interest and can be expressed as:

$$C \{\sin \omega_m t + \sin (\omega_m(t-d) + \pi\} = B_m \sin (\omega_m t + P_m) \quad (4)$$

$$D \{\sin \omega_a t + \sin (\omega_a(t-d) + \pi\} = B_a \sin (\omega_a t + P_a) \quad (5)$$

where $\pi = 3.14159$, $P_{m,a}$ are static phase offsets and the constants $B_{m,a}$ are $$B_m = [C^2 + C^2 + 2C^2 \cos(-\omega_m d)]^{\frac{1}{2}} = 2C[1 - \cos(\omega_m d)]^{\frac{1}{2}} = 2C[2\sin^2(\omega_m d/2)]^{\frac{1}{2}} = 2 C \sin (\omega_m d/2) \quad (6)$$

and by analogy $$B_a = 2D \sin (\omega_a d/2) \quad (7)$$

For small signals $\omega_a d/2$ is less than 0.2. The term $\sin \omega_a d/2$ is approximated as $\omega_a d/2$. $B_a = D\omega_a d$ which is clearly seen to increase with frequency $\omega_a$. Note also that when $\omega_a$ is small, the sensitivity is low. Assuming that all signals of interest $B_a$ are small so that small angle approximation holds, $\sin X = X$ and $\cos X = 1$.

The ac signal can now be expressed as $$I_{ac} = 2AB \cos \{B_m \sin (\omega_m t + P_m) + B_a \sin (\omega_a t + P_a)\} \quad (8)$$

Bessel Function expansion results in terms at the fundamental of the carrier and at the second harmonic (DC and higher order terms are neglected) as follows:

$$I_F(t) = 4AB J_1(B_m) \sin(\omega_m t + P_m) B_a \sin (\omega_a t + P_a) \quad (9)$$

$$I_{2H}(t) = 4AB J_2(B_m) \cos 2(\omega_m t + P_m) \quad (10)$$

Accordingly, the $I_{2H}$ is essentially free of signals and is available to generate a reference signal at the fundamental frequency which is applied to mixer 38 through the divider 40. As is observed in (9), the carrier signal is amplitude modulated with $B_a$ which is recovered at the output of the mixer 38.

Figure 2B:
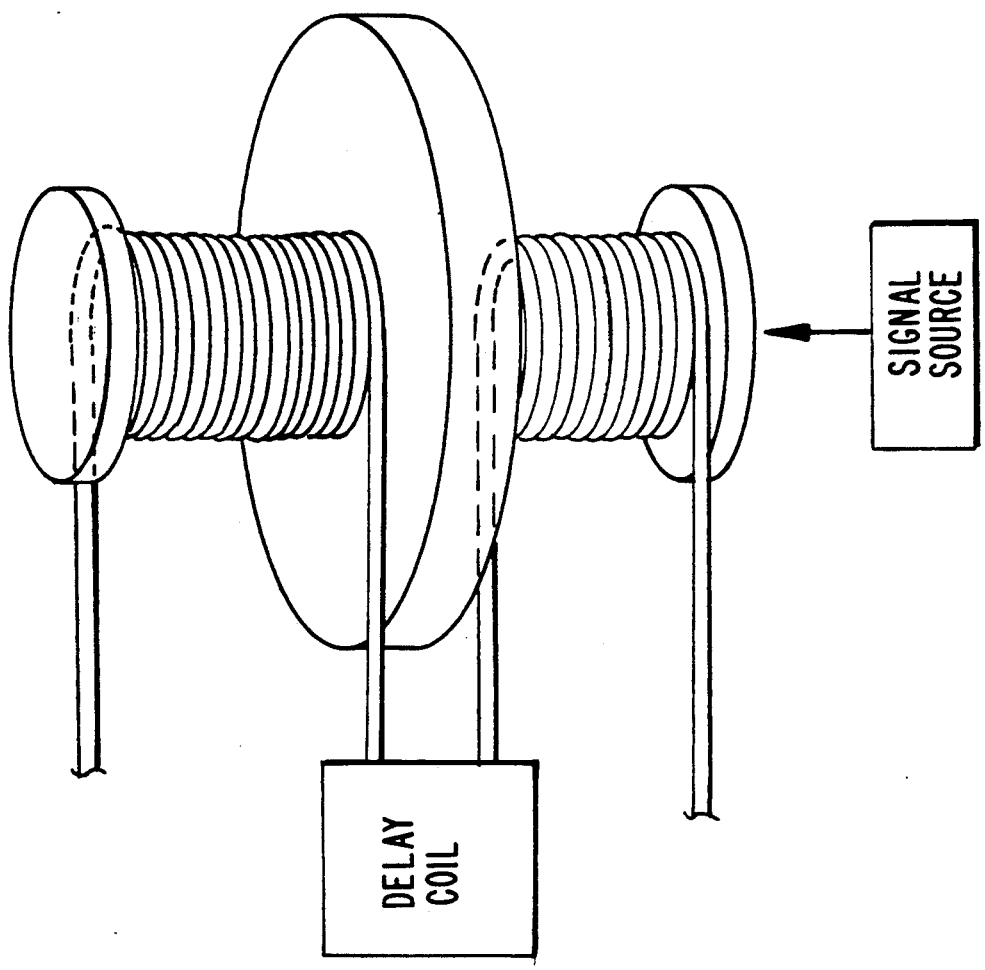
FIG. 2b depicts another sensor usable with the circuits of FIG. 1.

It will be appreciated that the delay factor d can be altered by introducing a fiber optic delay coil in series with the sensor coil. This alternative is shown in FIG. 2a and additional variation is shown in FIG. 2b. The incorporation of the delay coil into the sensor provides improved sensitivity since the fiber in the delay coil is also detecting the signal and the sensitivity of interferometric sensors depends directly on the length of the fiber. It should be noted that references to high frequencies are related to the above equations. The frequency range of the sensor can be adjusted over a relatively large range. This can be done by adjusting the length of the fiber and the frequency of the oscillator driving the modulator, i.e., the frequency is stretching the piezoelectric core of the modulator.

What is claimed is:

1. A method for measuring high frequency analog signals of low amplitude using optical sensors to convert such signals into electrical signals containing the analog information comprising the steps of:
   (a) arranging a fiber optic coil made of single mode fiber optic material so as to have optical path modified by the analog signals;
   (b) using polarizing preserving fibers made out of single mode fiber optic material in said fiber optical coil to operate as a depolarizer;
   (c) Injecting counter rotating beams of low coherence light into the coil to be modulated by the analog signals;
   (d) converting the light beams into electrical signals containing the analog information; and
   (e) demodulating the electrical signals to recover the analog information.

2. The method according to claim 1 wherein step (b) further comprises the step of optically modulating one of the counter rotating beams with a carrier frequency.

3. The method according to claim 1 wherein step (b) further comprises the steps of:
   phase modulating a beam of low coherence light using an optical modulator excited at a frequency greater than the anticipated frequency for the analog signal.

4. The method according to claim 1 wherein the length of the fiber optic coil is adjusted to affect the delay between the counter rotating beams.

5. A sensor for measuring high frequency analog signals for low amplitude comprising in combination:
   fiber optic sensing means comprising a coil of single mode of fiber optic material, the optical path length of which may be altered by the analog information, said coil including polarization preserving fibers made out of single mode fiber optic material arranged as a depolarizer;
   (b) a source of low coherence light;
   (c) optical interferometer means including said fiber coil for splitting and applying a beam of low coherence light from said source to each end of said coil such that counter rotating beams thus produced are modulated by the analog signals;
   (d) means for combining said counter rotating beams of light and converting them into electrical signals containing the analog information; and
   (e) demodulating means for recovering the analog information as electrical signals.

6. The sensor according to claim 5 wherein said optical interferometer meansfurther includes optical modulator means connected to receive a portion of said beam of low coherence light and applying it as carrier signal to one end of said coil.

7. The sensor according to claim 5 wherein said optical interferometer includes a beam splitter for splitting said beam of low coherence light into at least two beams, said polarization preserving fibers being connected to apply said beam to one side of said coil, and an optical modulator means connected to receive another split beam and apply it to the other side of the coil.

8. The sensor according to claim 7 wherein said optical modulator is driven by an oscillator operating at a frequency in excess of the expected frequency of the analog signal to phase modulate the split beam.

9. The sensor according to claim 5 wherein said means for splitting the beam and said means for combining the counter rotating beams is a fiber coupler.

10. The sensor according to claim 5 wherein said coil is wound on a spool and the analog signals are applied to said spool so as to alter the optical path length of the fiber optic coil.

11. The sensor according to claim 10 wherein two or in said sensor is comprised of two coils, at least one of said coils being wound on said spool.

12. The sensor according to claim 11 wherein at least two fiber optic coils are wound on one or more spools.

13. The sensor according to claim 7 wherein the demodulator means of claim 5 includes means for recovering the second harmonic of the optical signal and using it as a local oscillator to produce an electrical analog of the information of interest while compensating for the static delay between the counter rotating beams.

14. A sensor for measuring high frequency analog signals of low amplitude such as a source of vibrations comprising in combination:
   fiber optic sensing means including at least one fiber optic coil wound on a spool, with the spool connected to be affected by said analog signals to strain the fiber optic, said fiber optic sensing means including a depolarizer made out of single mode fiber optic material;
   (b) a source of low coherence light including means for injecting light from said source into both ends of said fiber optic coil as counter rotating beams and for combining said beams to produce an optical output signal, said means also including an optical modulator driven at a reference frequency to phase modulate one of said counter rotating beams;
   (c) photodetector means receiving said optical output signal and converting same into an electrical signal containing the analog information; and
   (d) demodulator means receiving the electrical signal and including means for splitting the electrical signal into a reference frequency and a second harmonic and recombining the signals to recover the analog information as an output signal.

* * * * *